United States Patent [19]

Ebata et al.

[11] Patent Number: 4,724,020
[45] Date of Patent: Feb. 9, 1988

[54] METHOD FOR JOINTING CERAMIC ELEMENTS

[75] Inventors: Yoshihiro Ebata, Kawanishi; Masanori Kohyama, Ikeda; Nobuyuki Tamari, Ikeda; Makoto Kinoshita, Ikeda; Ryozo Hayami, Takarazuka; Susumu Mori, Minoo; Masahiko Nozawa, Takatsuki; Tokuzo Nishi, Osaka, all of Japan

[73] Assignee: Japan as represented by Director General, Agency of Industrial Science and Technology, Tokyo, Japan

[21] Appl. No.: 900,778

[22] Filed: Aug. 27, 1986

[30] Foreign Application Priority Data

Sep. 17, 1985 [JP] Japan .................................. 60-205865
Sep. 17, 1985 [JP] Japan .................................. 60-205960

[51] Int. Cl.⁴ ........................ B32B 18/00; B32B 31/28
[52] U.S. Cl. ............................................. 156/82; 156/89; 156/272.2; 156/273.9; 156/274.8; 156/379.6; 156/379.7; 156/379.8; 156/380.3; 156/497; 156/499

[58] Field of Search ............. 156/82, 89, 272.2, 273.9, 156/274.8, 379.6, 379.7, 379.8, 380.3, 497, 499

[56] References Cited

U.S. PATENT DOCUMENTS 2,640,796  6/1953  Langer ........................... 156/380.3
4,028,551  6/1977  Thompson ...................... 156/380.3
4,420,352 12/1983  Schroeder et al. ................... 156/89

FOREIGN PATENT DOCUMENTS 2306935  9/1973  Fed. Rep. of Germany ........ 156/82

Primary Examiner—Caleb Weston
Attorney, Agent, or Firm—Scully, Scott, Murphy & Presser

[57] ABSTRACT

A method for jointing ceramic elements is disclosed. Ceramic elements to be joined are arranged between a pair of torces each having a nozzle for spouting combustion gas.

The joint line of ceramic elements is first heated by flames of combustion gas spouted from each nozzle and, then, a high voltage is applied between said pair of torches. Ceramic elements are joined by said heating and applying a high voltage between torches.

7 Claims, 1 Drawing Figure

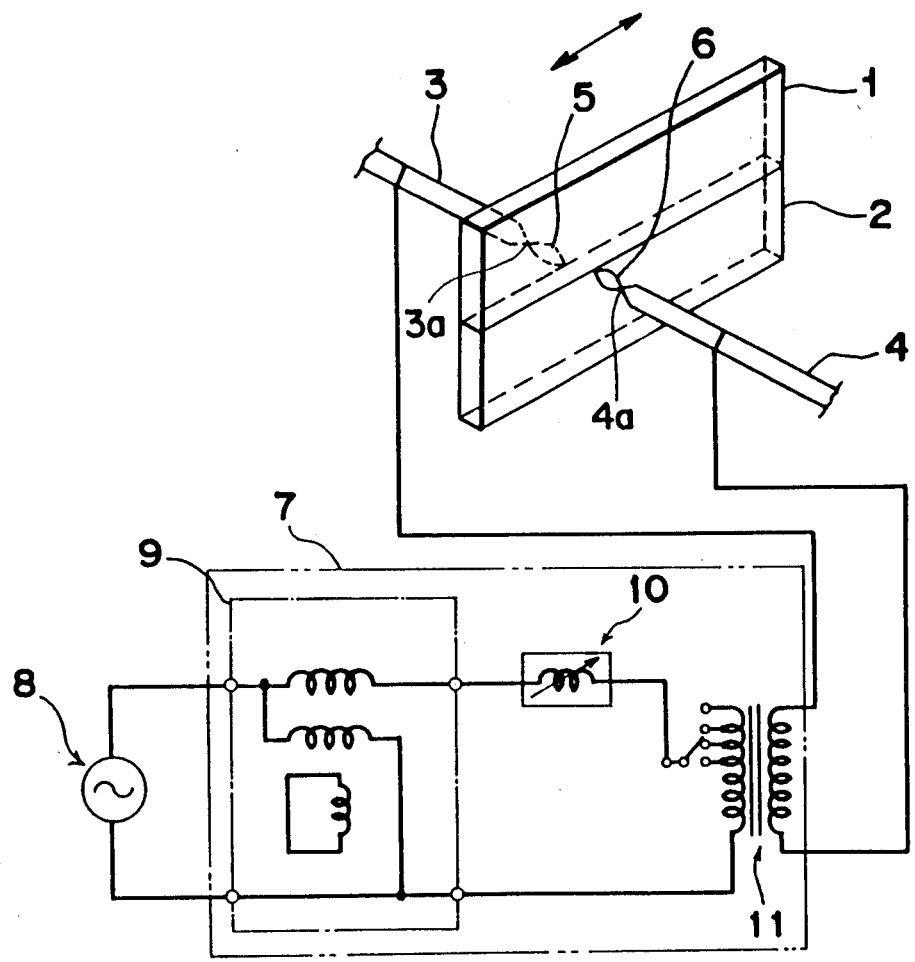

METHOD FOR JOINTING CERAMIC ELEMENTS

BACKGROUND OF THE INVENTION

1. Field of the Invention

The present invention relates to a method for jointing two ceramic elements with use of electric energy.

2. Description of the Prior Art

In a conventional method for jointing two ceramic elements, these elements are heated to a high temperature sufficient for jointing them by welding in a furnace such as an electric furnace with or without an adhesive material therebetween. However, this method has disadvantages in that a furnace of big scale is needed for jointing elements of large sizes, that considerable energy loss is involved in such a furnace of big scale and that surfaces of each ceramic element are easily oxidized when heated in an natural atmosphere.

In order to avoid these disadvantages, there has been proposed a method in which only joint portion is heated partially. In such a partial heating method, laser beam heating, electron beam heating, radio-frequency heating or heating by electric discharge in oil has been employed as a heating means. However, the conventional partial heating method mentioned above has such disadvantages that a chamber means of big scale may be needed for pre-heating ceramic elements and for adjusting atmosphere and/or that an electric power source for generating a high energy beam and a focusing device therefor should be installed.

SUMMARY OF THE INVENTION

One object of the present invention is to provide a partial heating method for jointing ceramic elements with each other easily and in an economical way.

Another object of the present invention is to provide a jointing method suitable for jointing ceramic elements at least one of which shows an electrical conductivity at a high temperature.

Other object of the present invention is to provide a jointing method suitable for jointing ceramic elements each of which does not show any electrical conductivity even at a high temperature.

Further object of the present invention is to provide an apparatus for jointing ceramic elements which has a relatively simple structure and is easy in operation thereof.

One further object of the present invention is to provide an apparatus for jointing ceramic elements which is applicable to joint not only ceramic elements which show an electrical conductivity at a high temperature but also ceramic elements which do not show any electrical conductivity even at a high temperature.

In order to achieve these objects, according to the present invention, there is provided a method for jointing ceramic elements being comprised of steps as follows:

a step for contacting joint faces of ceramic elements to each other, a step for positioning said ceramic elements between at least one pair of torches being arranged apart from each other and oppositely each of which is made of an electrically conductive material and has a nozzle for spouting combustion gas at one end opposed to the other torch, a step for heating at least a portion of joint line defined by said joint faces on both sides thereof with flames being spouted from said nozzles, and a step for applying a high voltage of from 1,000 to 10,000 (volts) between said pair of torches.

According to this method, since Joule's heat is caused by an electric current which is generated to flow across the joint faces to be jointed, ceramic material forming the joint face is welded by said heat in a short time to give a tight joint between ceramic elements.

If the ceramic element is made of such a ceramic material that it shows an electrical conductivity when heated to a predetermined high temperature, a path of electric current for generating Joule's heat is provided when portions exposed to flames spouted from nozzles are heated to a predetermined high temperature.

If the ceramic element is made of a non-conductive ceramics which does not show any electrical conductivity even at a high temperature, it becomes necessary to use such an adhesive material for jointing ceramic elements that it shows an electrical conductivity when heated to a high temperature.

The electrical conductivity shown by the ceramics itself or the adhesive material is of such an order that an electric current of 50 mAs to 1 ampere can be obtained when a high voltage of from 1,000 to 10,000 (volts) is applied at a temperature of 800° C. or more. In the present invention, it is irrespective whether the ceramics or adhesive material has an electrical conductivity at an ambient temperature since the electrical conductivity is needed only at a high temperature.

Such ceramics as lanthanum chromite, tin oxide or silicon carbide can be recited as examples of ceramics which show an electrical conductivity at a high temperature. Also, such ceramics as alumina, zirconia or cordierite show an electrical conductivity at a high temperature since glass components such as $SiO_2$, $Al_2O_3$, $Fe_2O_3$ and so on contained therein show an electrical conductivity due to the ion conduction of the glass component caused at a high temperature.

Accordingly, the present invention is directly applicable to such a ceramic material as mentioned above without use of an adhesive material. Ceramic elements to be jointed may be made of identical ceramics or of different ceramics. In the case that two ceramic elements of different ceramics are to be jointed, it is enough for jointing if one of them has such an electrical conductivity mentioned above.

If both ceramic elements to be jointed do not have such a property as mentioned above, it becomes possible to joint ceramic elements by utilizing an adhesive material which shows an electrical conductivity at a high temperature. In this case, both joint surfaces of ceramic elements are jointed at first by such an adhesive material. And then, the adhesive material jointing ceramic elements are heated on both sides thereof by burning combustion gases to a high temperature at which said adhesive material shows an electrical conductivity to allow an electric current to flow across said adhesive material.

The adhesive material has desirably such an electrical conductivity that an electric current of 50 mAs to 1 ampere may be obtained when a high voltage of from 1,000 to 10,000 (volts) is applied between two torches at a high temperature of 800° C. or more. For example, there is cited such a known adhesive material for ceramics that it contains one or more glass components such as kaolin (mineral), alumina ($Al_2O_3$), silica ($SiO_2$) and- /or the like as a main component and further includes one or more oxides, sulfides, chlorides or halides of Cu, Ni, Mn, In, Mo and/or Zn; one or more oxides of rare earth elements such as La, In, V, Ho and/or Y; one or more metals such as Mo, Mn, W, Fe, Co, Ag, Ni, Sn, Zn and/or the like; and one or more fluorides such as calcium fluoride, sodium fluoride or the like.

However, it is also possible to give an electrical conductivity to an adhesive material which does not show any conductivity at a high temmerature by adding one or more electrically conductive materials such as carbon, fluoride, glass, oxide metal and/or rare earth element thereto.

Further, it is also possible to use an adhesive material which does not show such an electrical conductivity as mentioned above just for jointing ceramic elements physically if at least one of ceramic elements has such an electrical conductivity as mentioned above.

Upon using an adhesive material, a suitable one is to be chosen taking differences in the thermal coefficient between the adhesive material and the ceramic element and the like into consideration similarly to the conventional case.

In order to heat the portion to be jointed, at least a pair of torches is so arranged on the both sides of said portion that their nozzles are opposed to each other and positioned to have a suitable and substantially same distance against each side face of said portion. Said torch is made of an electrically conductive material having a suitable heat resistivity. Such a material as brass, copper, tungsten, carbon or molybdenum is desirably used. The distance between the tip end of the nozzle and the ceramic element is so set that the gas flame from the nozzle may reach to the side face of the ceramic element. City gas, propane gas, mixed gas of hydrogen and oxygen gases and/or the like can be used solely or in combination as combustion gases.

Prior to heating by said combustion gases, it is desirable to heat ceramic elements to a temperature of 800° C. or more in order to avoid possible spalling.

Since the electrical conductivity of the ceramic element or adhesive material is sufficiently enhanced by heating with combustion gas, electric current flowing therethrough becomes strong under a voltage of from 1,000 to 10,000 volts to generate Joule's heat sufficient for welding ceramic elements with each other.

When an adhesive material showing an electrical conductivity is used, it is melted in a short time due to Joule's heat generated and the ceramic elements are jointed tightly with each other thereby. For instance, an electric current of about 0.5 A is obtained at a voltage of about 4,000 volts by heating the adhesive material made of a mixture of calcium fluoride of 70 wt % and kaolin of 30 wt % when applied to silicon nitride ceramics.

If said adhesive material is not heated, a very high voltage of about 4,000 volts is required for obtaining an electric current of 0.5 A.

The use of such an adhesive material enhances the tightness of joint when compared to the case in which it is not used for jointing. Further, it becomes possible to make an electric current flow only through said adhesive material layer even when each joint surface has a complex configuration. Accordingly, it is very useful for jointing ceramic elements having jointing surfaces of complex configurations respectively to use such an adhesive material.

Further, if an adhesive material having an electrical conductivity and a melting property better than those of the ceramics to be jointed is used, the joint operation is made easier.

The voltage to be applied for generating an electric current for jointing is chosen according to properties of ceramic elements and/or of the adhesive material in a range of from 1,000 to 10,000 volts.

Voltage lower than 1,000 volts is too low to obtain an electric current sufficient for jointing ceramic elements. Voltage higher than 10,000 volts is not necessary since an electric current sufficient for jointing ceramic elements is obtained at a voltage lower than 10,000 volts.

Since the electrical conductivity of the joint portion is increased rapidly when heated by Joule's heat, the electric current is increased rapidly. Accordingly, it is desirable to regulate the electric current so as to maintain it in a suitable range according to properties of ceramics and/or the adhesive material. In order for that, it is desirable to provide a current control circuit.

A current regulating circuit utilizing a magnetic control device such as coil means, saturable reactor or magnetic amplifier or a semi-conductor device such as a thyrister, triac, GTO or transistor can be used as a current control circuit mentioned above.

According to the present invention, it becomes possible to joint ceramic elements in a short time and in an easy way irrespective to their configurations.

Further, according to the present invention, the joint obtained is uniform and tight since the electrical current passes through whole width of the joint portion.

Moreover, according to the apparatus of the present invention, the structure thereof is simplified and the apparatus itself is made compact. Furthermore, it is applicable to ceramic elements of big sizes, ceramic elements of complex configurations and/or ceramic elements of long sizes without accompanying a large heating energy loss.

BRIEF DESCRIPTION OF THE DRAWING

The present invention will be more fully understood and further advantages will become apparent when reference is made to the following detailed description of the accommanying drawing in which:

The FIGURE is a schematical perspective view showing a preferred embodiment of the present invention.

DESCRIPTION OF THE PREFERRED EMBODIMENTS

<First Embodiment>

Referring now to the FIGURE, ceramic elements 1 and 2 jointed at each joint face to each other with use of a suitable adhesive material are set between a pair of torches 3 and 4 arranged opposite to each other. As a torch, there are used similar nozzles 3a and 4a to those made of copper for welding metals. Each nozzle is directed perpendicularly to the joint line defined by two joint faces. The distance between the top end of the nozzle and the side surface of the ceramic element is set to about 3 cm so as for the flame 5 and 6 of combustion gas to reach to said side surface.

The pair of torches 3 and 4 is connected to an electric power control circuit 7. The electric power control circuit 7 is comprised of a commercial power source 8 of AC 200 (V), an induction voltage regulator 9, a variable inductance reactor 10 and a step-up transformer 11 of 200 V/6,600 V. Said voltage regulator 9, the reactor 10 and the primary coil of the transformer 11 are connected in series to the power source 8.

The pair of torches are connected to the secondary coil of the transformer 11.

The ceramic elements 1 and 2 in this embodiment are made of silicon nitride and are formed as a plate of thickness of 10 mm, length of 10 cm and width of 5 cm respectively. As adhesive material being made by mixing calcium fluoride of 70 wt % with kaolin of 30 wt % of 3 grammes is applied onto the joint face of 10 mm×10 cm of one ceramic element, the ceramic elements are jointed to each other with said adhesive material applied.

Then, city gas is supplied to each torch and city gas spouted from the nozzle is fired. The length of flame is adjusted to 3 cm. Thereafter, an AC voltage of 5,000 V is applied to the pair of torches. The electric current flowing through the layer of adhesive material in the direction of width thereof became 0.5 A after 10 seconds from the start of application of voltage. Thereafter, the current is regulated at 0.5 A by the current control circuit 7.

The ceramic elements are moved relative to the pair of torches along the joint line at a constant velocity of 5 cm/min while applying said voltage to the torches.

About two minutes later, the joint operation is completed over total length thereof. The joint strength obtained is about 40 kg/mm$^2$ when measured by three points bending test method.

<Second Embodiment>

In this embodiment, there are used ceramic plate elements made of lanthanum-chromite which shows an electrical conductivity. Dimensions of the ceramic plate are same to those of the first embodiment. Two ceramic plates are abutted to each other at their joint faces (each of 10 mm×10 cm) without using any adhesive material. Also, heating condition and the voltage to be applied are kept same as those in the first embodiment. The electric current became 0.7 A after 5 seconds and was kept at 0.7 A thereafter. Then, the ceramic plates were moved at a velocity of 5 cm/min relative to the torches while applying 5,000 volts to complete the joint between two ceramic plates. The joint strength is 29 kg/mm$^2$ when measured by three point bending test method.

<Third Embodiment>

In this embodiment, there are used ceramic plate elements made of alumina ($Al_2O_3$) including one or more glass components which show an electrical conductivity at a high temperature. Dimensions of the ceramic plate are same to those of the first embodiment (10 mm×10 cm×5 cm). Two ceramic plates are abutted to each other at their joint faces (each of 10 mm×10 cm) without using any adhesive material. While heating the joint portion similarly to the first embodiment, a voltage of 7,000 volts was applied between two torches. The electric current was attained to 1 ampere five seconds later and was kept at 1 ampere thereafter. Then, the ceramic plates were moved at a velocity of 5 cm/min relative to the torches while keeping said current to complete the joint operation over the whole length of the joint face. The joint strength obtained is 22 kg/mm$^2$ when measured in the method same to that of the first or second embodiment.

Although the present invention has been fully described by way of example with reference to the accompanying drawing, it is to be noted here that various changes and modifications will be apparent to those skilled in the art. Therefore, unless otherwise such changes and modifications depart from the scope of the present invention, they should be construed as being included therein.

What is claimed is:

1. A method for jointing ceramic elements being comprised of steps as follows;
   a step for contacting joint faces of ceramic elements to each other,
   a step for positioning said ceramic elements between at least one pair of torches being arranged apart from each other and oppositely each of which is made of an electrically conductive material and has a nozzle for spouting combustion gases at one end opposed to the other torch,
   a step for heating at least a portion of joint line defined by said joint faces on both sides thereof with flames being spouted from said nozzles, and
   a step for applying a high voltage of from 1,000 to 10,000 (volts) between said pair of torches.

2. A method according to claim 1, wherein at least one of said ceramic elements shows an electrical conductivity when heated to a predetermined temperature.

3. A method according to claim 1, wherein said voltage applied between said pair of torches is an alternate current voltage.

4. A method according to claim 1, wherein said voltage applied between a pair of torches is a direct current voltage.

5. A method for jointing ceramic elements being comprised of steps as follows;
   a step for contacting joint faces of ceramic elements to each other interposing adhesive material therebetween, said adhesive material showing an electrical conductivity when heated to a predetermined temperature,
   a step for positioning said ceramic elements between at least one pair of torches being arranged apart from each other and oppositely each of which is made of an electrically conductive material and has a nozzle for spouting combustion gas at one end opposed to the other torch,
   a step for heating at least a portion of joint line defined by said contacted joint faces on both sides thereof with flames being spouted from said nozzles, and
   a step for applying a high voltage of from 1,000 to 10,000 (volts) between said pair of torches.

6. An apparatus for jointing ceramic elements at high temperatures being comprised of
   at least one pair of torches which generate high-temperatures being arranged apart and in a direct line opposite from each other, each of which is made of an electrically conductive material and has a nozzle for spouting combusting gas at one end opposed to an in the direction of the other torch,
   a power source for applying a high voltage of from 1,000 to 10,000 (volts) between said pair of torches in order to generate an electrical discharge between said nozzles, and
   a control circuit for controlling an output current of said power source to a predetermined value from the time that portions of the ceramic elements exposed to flames have been heated to a predetermined temperature.

7. Apparatus as described in claim 6 wherein said torches generate temperatures of at least 800° C.

* * * * *